(12) United States Patent
Kubota

(10) Patent No.: US 6,767,052 B2
(45) Date of Patent: Jul. 27, 2004

(54) FENDER STRUCTURE

(75) Inventor: Yutaka Kubota, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/368,354

(22) Filed: Feb. 20, 2003

(65) Prior Publication Data

US 2003/0173802 A1 Sep. 18, 2003

(30) Foreign Application Priority Data

Mar. 15, 2002 (JP) ...................................... P2002-071311

(51) Int. Cl.[7] .............................................. B62D 25/10
(52) U.S. Cl. ........................... 296/203.02; 296/187.09; 296/187.12; 296/193.11
(58) Field of Search ..................... 296/187.01, 187.03, 296/187.09, 187.12, 193.01, 193.09, 193.11, 198, 203.02

(56) References Cited

U.S. PATENT DOCUMENTS

| | | | | |
|---|---|---|---|---|
| 3,044,822 A | * | 7/1962 | Dean et al. ............ | 296/193.09 |
| 3,909,058 A | * | 9/1975 | Kramer et al. ......... | 296/187.03 |
| 4,438,969 A | * | 3/1984 | Kamijo et al. ........... | 296/146.9 |
| 4,623,190 A | * | 11/1986 | Fujimori et al. ............ | 296/198 |
| 5,466,035 A | * | 11/1995 | Klages et al. ................ | 296/205 |
| 6,547,316 B2 | * | 4/2003 | Chung .................... | 296/187.03 |
| 2002/0063443 A1 | * | 5/2002 | Lee .............................. | 296/198 |
| 2002/0171262 A1 | * | 11/2002 | Ozawa ........................ | 296/189 |
| 2003/0015890 A1 | * | 1/2003 | Ahn ............................ | 296/194 |
| 2003/0052517 A1 | * | 3/2003 | Nakata ........................ | 296/194 |

FOREIGN PATENT DOCUMENTS

| | | | | |
|---|---|---|---|---|
| EP | 1 138 579 | | 10/2001 | |
| GB | 2046183 A | * | 11/1980 | ................. 196/198 |
| JP | 06-336179 | | 12/1994 | |
| JP | 2000-108841 | | 4/2000 | |
| JP | 2001-310767 | | 11/2001 | |
| JP | 2001-310768 | | 11/2001 | |

* cited by examiner

Primary Examiner—D. Glenn Dayoan
Assistant Examiner—Paul Chenevert
(74) Attorney, Agent, or Firm—McDermott Will & Emery LLP

(57) ABSTRACT

A fender structure which includes a pair of fenders provided at sides of an engine compartment. Each of the fenders has a platform portion extending toward inside of the engine compartment, and a longitudinal wall portion extending downward from an inner edge of the platform portion and joined to a reinforcing member in the engine compartment. The longitudinal wall portion of the fender is slanted, extending outward in a vehicle transverse direction.

4 Claims, 6 Drawing Sheets

FENDER STRUCTURE

BACKGROUND OF THE INVENTION

1. Field of the Invention

The present invention relates to a fender structure of a vehicle.

2. Description of the Related Art

Japanese Patent Application Laid-Open No. 6(1994)-336179 discloses a front fender 1 which has, on its engine compartment 2 side, a slant wall 3 fixed to a hood ledge reinforce 5 by bolts 6, and an absorbing member 4 provided inside the front fender 1, as shown in FIG. 9.

SUMMARY OF THE INVENTION

In the above fender structure, however, when a large load is applied to the front fender 1 from above, the slant wall 3 resists the load, as shown in FIG. 10, generating large reaction force to the load, whereby impact energy absorption of the fender structure is lowered.

Moreover, the absorbing member 4 provided inside the front fender 1 is a factor of cost increase.

An object of the present invention is to provide a fender structure capable of generating a controlled reaction force to a load applied thereto without lowering impact energy absorption.

An aspect of the present invention is a fender structure comprising: a pair of fenders provided at sides of an engine compartment, each of the fenders having a platform portion extending toward inside of the engine compartment, and a longitudinal wall portion extending downward from an inner edge of the platform portion and joined to a hood ledge reinforce in the engine compartment, wherein the longitudinal wall portion of the fender is slanted, extending outward in a vehicle transverse direction.

BRIEF DESCRIPTION OF THE DRAWINGS

The invention will now be described with reference to the accompanying drawings, wherein.

DETAILED DESCRIPTION OF THE PREFERRED EMBODIMENT

Figure 1:
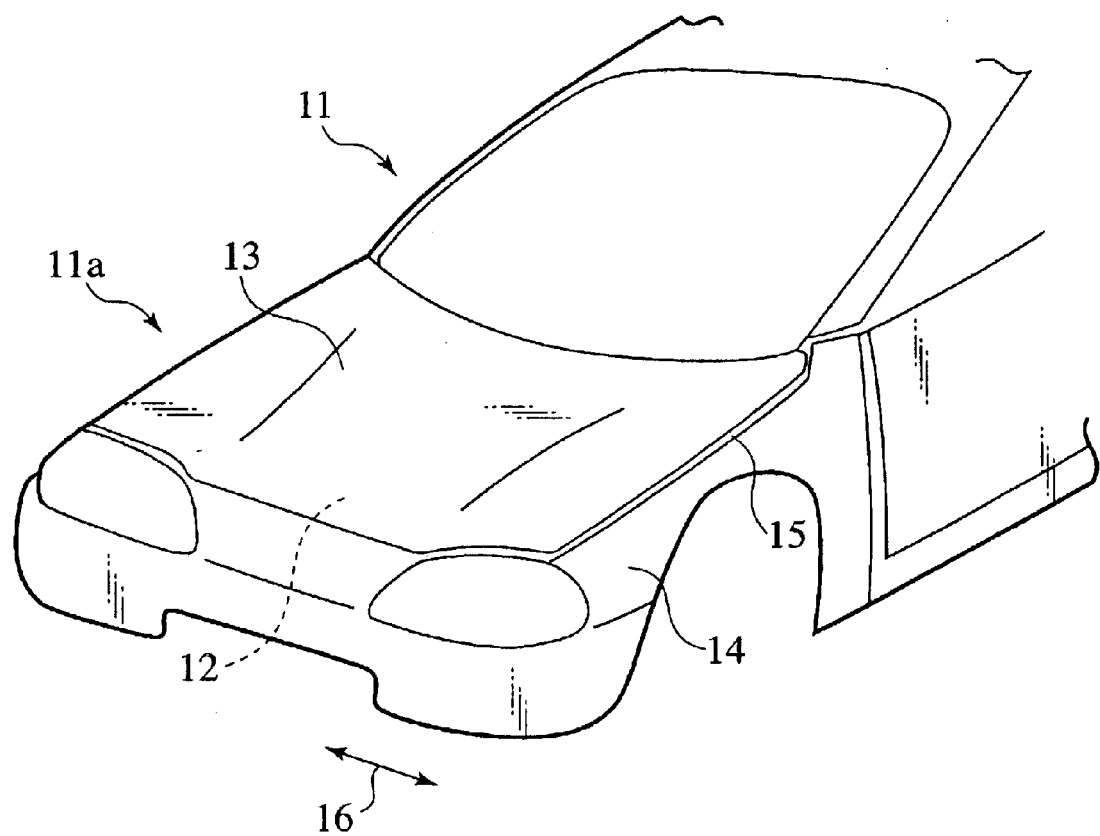
FIG. 1 is a perspective view of a front portion of a vehicle according to a first embodiment of a fender structure of the present invention, showing a hood and a fender.

Embodiments of the present invention will be explained below with reference to the drawings, wherein like members are designated by like reference characters.

FIGS. 1 through 5 show a first embodiment of the present invention.

Figure 2:
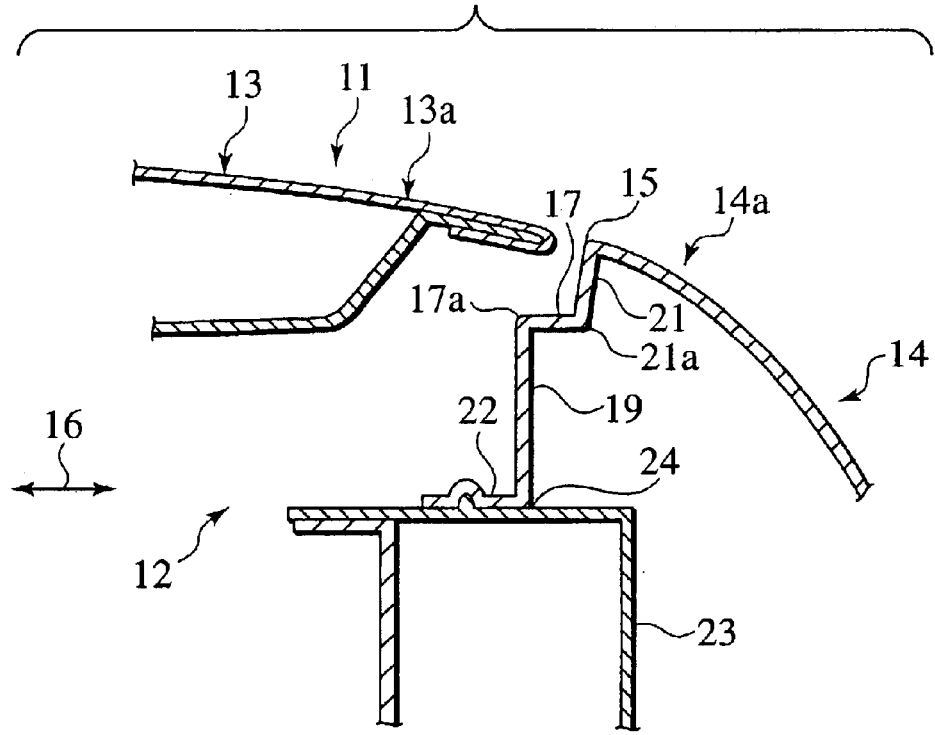
FIG. 2 is a longitudinal cross-sectional view of the fender of FIG. 1, showing a platform portion and a longitudinal wall portion extending substantially vertically from the platform portion.

In a front body 11a of a vehicle 11 such as an automobile or the like, as shown in FIG. 1, a hood 13 is provided to cover an upper portion of an engine compartment 12, and a pair of fenders 14 are provided to cover outer sides of the engine compartment 12 in a vehicle transverse direction 16. As shown in FIG. 2, an outer surface 13a of the hood 13 and an outer surface 14a of the fender 14 cooperate to constitute a smooth outer surface of the front body 11a.

The fender 14 has, under the outer surface of the front body 11a (inside the engine compartment 12), a longitudinal wall portion 21 extending downward from a parting line 15 of the fender 14 with the hood 13, which is an edge of the outer surface 14a on the hood 13 side; a substantially horizontal platform portion 17 extending from a lower edge 21a of the longitudinal wall portion 21 toward an inner side in the vehicle transverse direction 16 and supporting one of transversely outer edge portions of the hood 13; a longitudinal wall portion 19 extending downward from an inner edge 17a of the platform portion 17 in the vehicle transverse direction 16; and a substantially horizontal joint portion 22 extending from a lower edge of the longitudinal wall portion 19 toward the inner side in the vehicle transverse direction 16 and joined to a hood ledge reinforce 23 (reinforcing member) provided in the engine compartment.

Specifically, as shown in FIG. 2, the platform portion 17 is one step lower than the parting line 15 of the fender 14, positioned in transversely inner side than the parting line 15, and extends toward inside of the engine compartment 12. Moreover, the longitudinal wall portion 19 extends substantially vertically downward from the platform portion 17.

Moreover, the longitudinal wall portion 19 is formed to have lower rigidity than the transversely outer edge portions of the hood 13.

Figure 3:
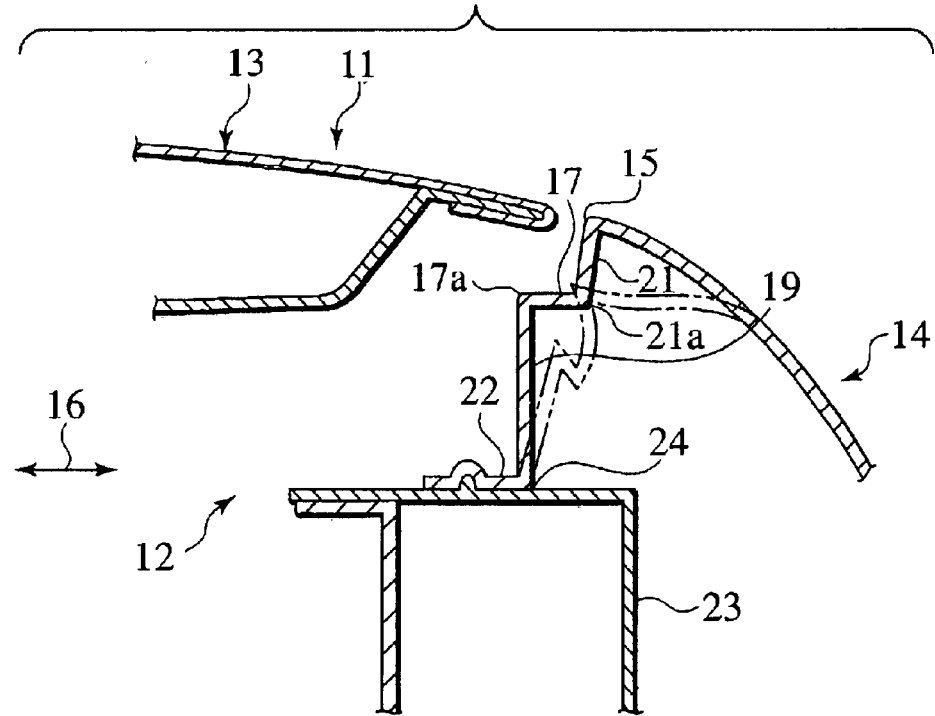
FIG. 3 shows a state of deformation of the fender of FIG. 2 when a load is applied thereto from above.

When a large load is applied to the fender 14 from above, the portions of the fender 14 arranged closer to the inner side of the engine compartment 12 than the parting line 15, specifically, the longitudinal wall portions 19 and 21, and platform portion 17, are deformed in a folded manner as shown by dotted lines in FIG. 3.

In this case, the longitudinal wall portions 19 and 21, and platform portion 17 are deformed with less resistance to the applied load, generating smaller reaction force thereto, whereby the fender 14 efficiently absorbs impact energy. Moreover, absorbing members and the like inside the fender 14 can be omitted, thus lowering cost thereof.

By changing size of the platform portion 17, the position of the parting line 15 between the fender 14 and the hood 13 can be flexibly adjusted, and a degree of freedom in design is increased.

Moreover, when a large load is applied to the hood 13 from above and the edge portion thereof interferes with the platform portion 17, the longitudinal wall portion 19 is deformed to a larger extent than the edge portion of the hood 13, since the longitudinal wall portion 19 is formed to have lower rigidity than the transversely outer edge portions of the hood 13. In other words, the longitudinal wall portion 19 can absorb more impact energy of the load applied to the hood 13 than the edge portion of the hood 13 does.

Figure 4:
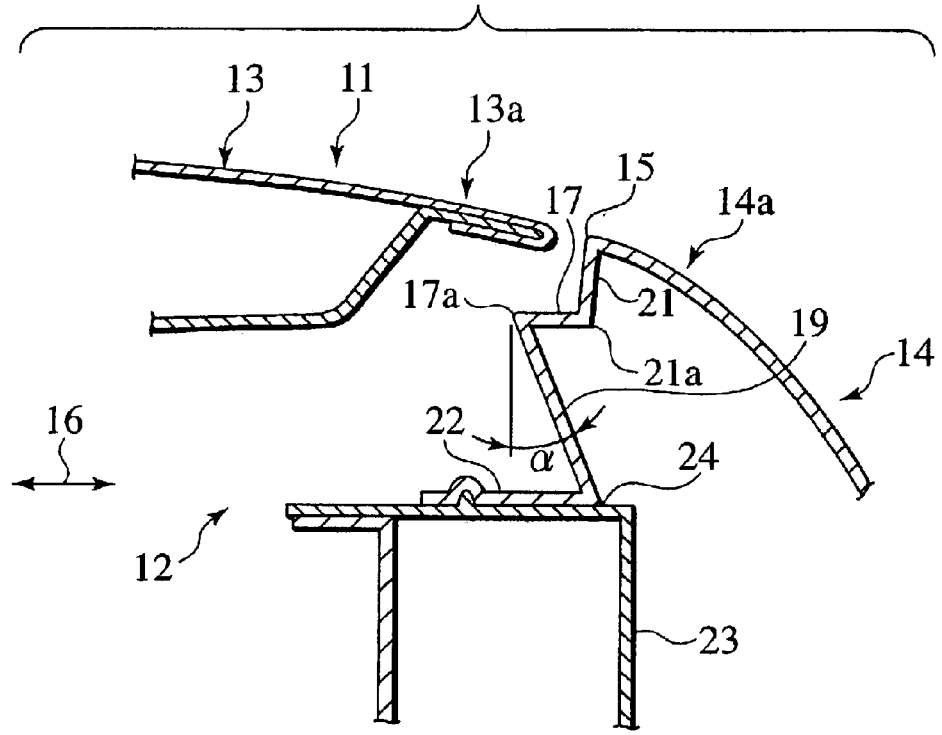
FIG. 4 is a longitudinal cross-sectional view of a fender according to a modification example of the first embodiment of the fender structure of the present invention, showing that a longitudinal wall portion extending downward from a platform portion slants.

In a modification example of the first embodiment shown in FIG. 4, the longitudinal wall portion 19 extending downward from the platform portion 17 is formed to be slanted in a so-called inverse shape, extending outward in the vehicle transverse direction 16 at slant angle $\alpha$ relative to a vertical axis. A joint point 24 of the longitudinal wall portion 19 to the hood ledge reinforce 23, which is located at the lower edge of the longitudinal wall portion 19 or the outer edge of the joint portion 22 in the vehicle transverse direction 16, is positioned closer to the outer side in the vehicle transverse direction 16 than the transversely inner edge 17a of the platform portion 17.

Figure 5:
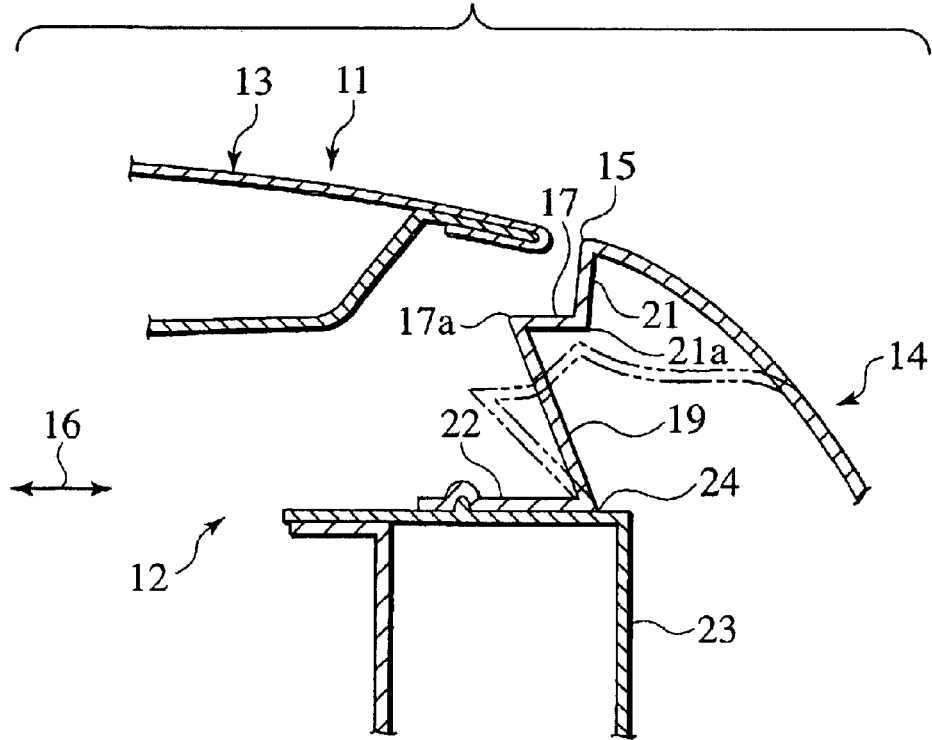
FIG. 5 shows a state of deformation of the fender of FIG. 4 when a load is applied thereto from above.

When a large load is applied to the fender 14 from above, the longitudinal wall portion 19 is deformed in a falling manner toward transversely inner side with the joint point 24 as a fulcrum as shown by dotted lines in FIG. 5.

With an increased slant angle $\alpha$, the longitudinal wall portion 19 becomes easy to fall at the time of deformation, thus further lowering reaction force to the load applied from above.

Hence, in addition to the above-described effect of the first embodiment, the impact energy can be absorbed more efficiently.

Figure 6:
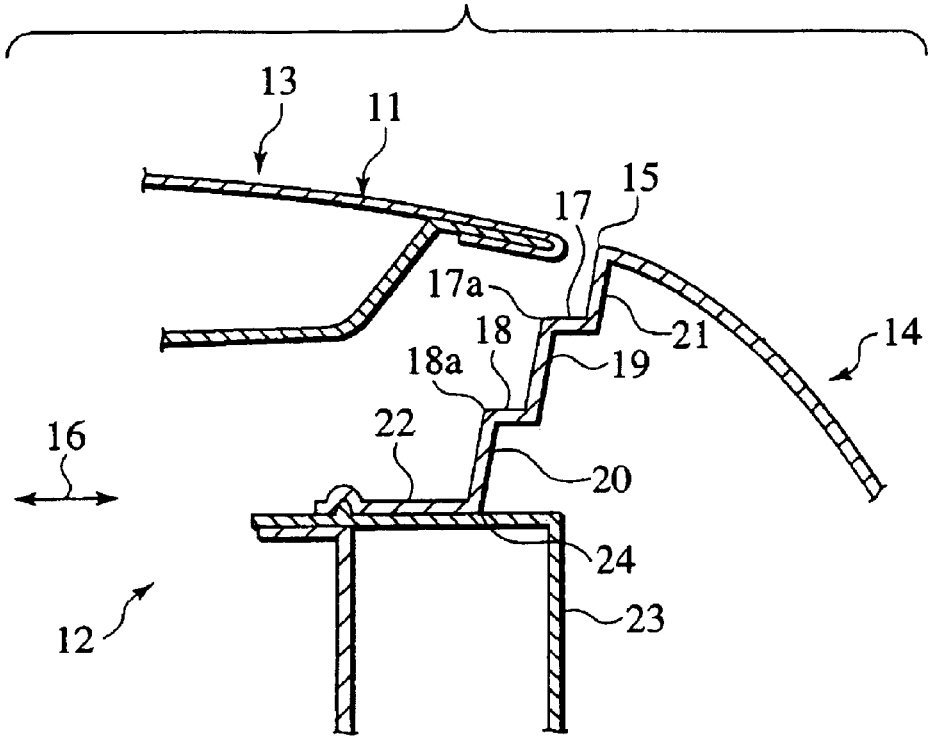
FIG. 6 is a longitudinal cross-sectional view of a fender according to a second embodiment of the fender structure of the present invention, showing two stages of platform portions and longitudinal wall portions extending substantially vertically from above platform portions.
Figure 7:
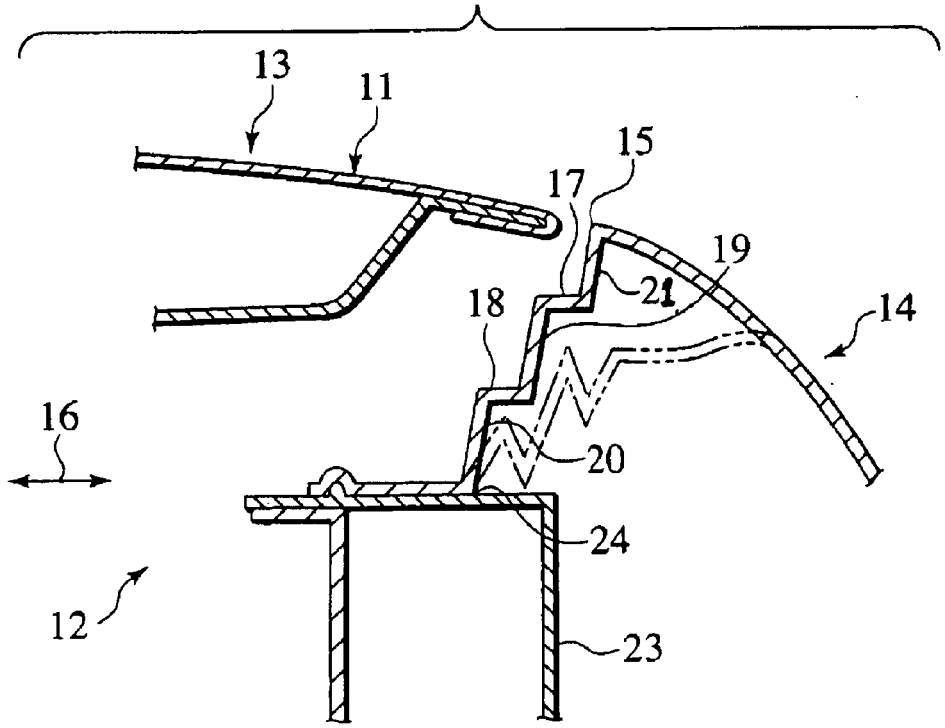
FIG. 7 shows a state of deformation of the fender of FIG. 6 when a load is applied thereto from above.
Figure 8:
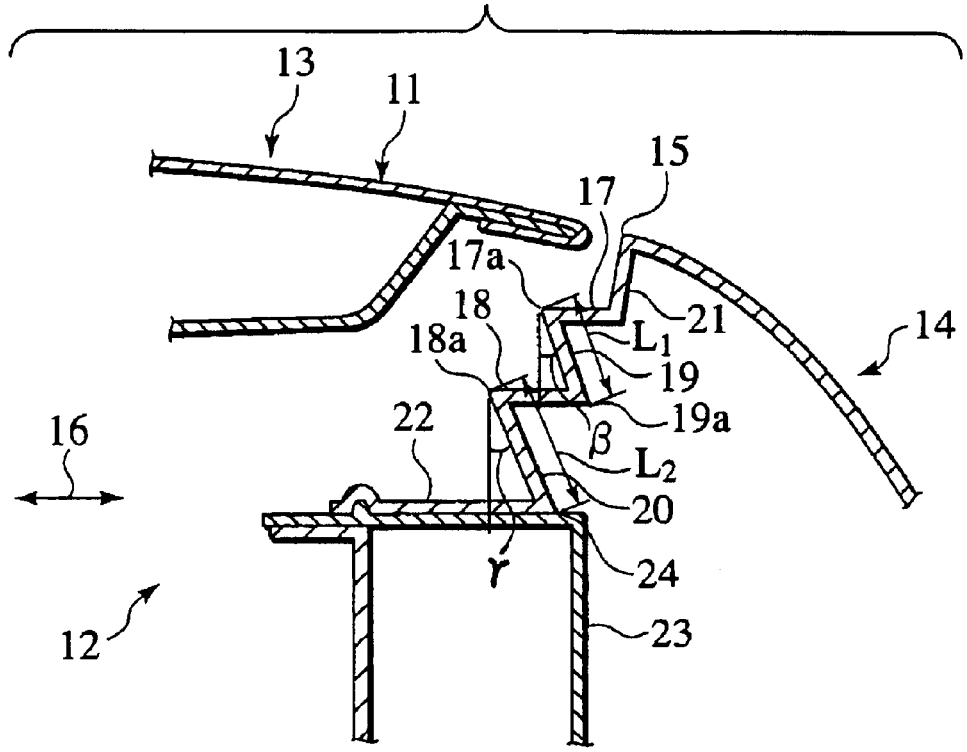
FIG. 8 is a longitudinal cross-sectional view of a fender according to a modification example of the second embodiment of the fender structure of the present invention, showing that longitudinal wall portions extending downward from respective wall portions slant.
Figure 9:
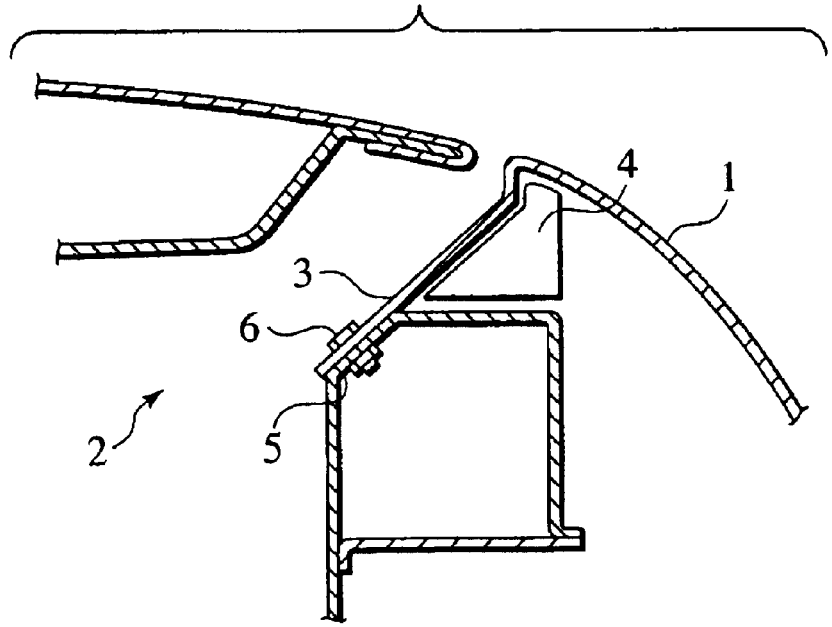
FIG. 9 is a longitudinal cross-sectional view of a fender according to a fender structure of the related art.
Figure 10:
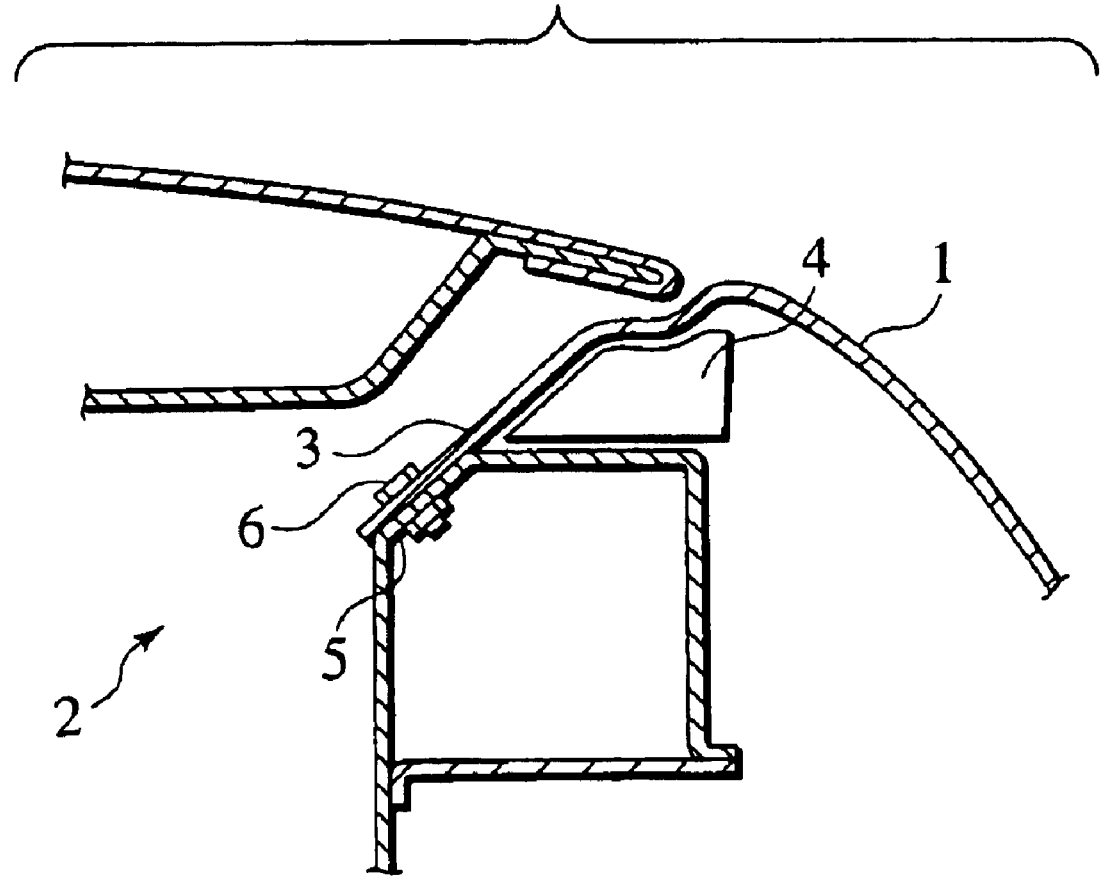
FIG. 10 shows a state of deformation of the fender of FIG. 9 when a load is applied thereto from above.

FIGS. 6 through 8 show a second embodiment of the present invention.

As shown in FIG. 6, in addition to the constitution of the first embodiment, the fender 14 according to the second embodiment further includes a substantially horizontal platform portion 18 extending from the lower edge of the longitudinal wall portion 19 toward the inner side in the vehicle transverse direction 16, and a longitudinal wall portion 20 extending downward from an inner edge 18a of the platform portion 18 in the vehicle transverse direction 16, from a lower edge of which the joint portion 22 joined to the hood ledge reinforce 23 extends toward the inner side in the vehicle transverse direction 16.

Moreover, the longitudinal wall portions 19 and 20, and platform portion 18 are formed to have lower rigidity as a whole than the transversely outer edge portion of the hood 13.

As described above, at least one or more of another platform portion 18 and another longitudinal wall portion 20 are provided below the platform portion 17 of the fender 14. Therefore, when a large load is applied to the fender 14 from above, the portions of the fender 14 arranged closer to the inner side of the engine compartment 12 than the parting line 15, specifically, the longitudinal wall portions 19, 20 and 21, and platform portions 17 and 18, are deformed in a folded manner as shown by dotted lines in FIG. 7.

In this case, the longitudinal wall portions 19, 20 and 21, and platform portions 17 and 18 are deformed with less resistance to the applied load, generating smaller reaction force thereto, whereby the fender 14 efficiently absorbs impact energy. Moreover, the absorbing members and the like inside the fender 14 can be omitted, thus lowering cost thereof.

By changing size of the platform portions 17 and 18, the position of the parting line 15 between the fender 14 and the hood 13 can be flexibly adjusted, and a degree of freedom in design is increased.

Moreover, when a large load is applied to the hood 13 from above and the edge portion thereof interferes with the platform portion 17, the longitudinal wall portions 19 and 20, and platform portion 18 are deformed to a larger extent than the edge portion of the hood 13 since the above three portions are formed to have total rigidity lower than the transversely outer edge portions of the hood 13. In other words, the longitudinal wall portions 19 and 20, and platform portion 18 can absorb more impact energy of the load applied to the hood 13 than the edge portion of the hood 13 does.

Note that, though the fender 14 having two stages of the platform portions 17 and 18 is exemplified in the second embodiment, the number of platform portions may be multiple, which is three or more stages.

In the modification example of the second embodiment shown in FIG. 8, the longitudinal wall portions 19 and 20 extending downward from the platform portions 17 and 18 respectively are extending transversely outward at slant angles $\beta$ and $\gamma$ relative to the vertical axis, respectively. The lower edge 19a of the longitudinal wall portion 19 is positioned closer to the outer side in the vehicle transverse direction 16 than the inner edge 17a of the platform portion 17 in the vehicle transverse direction 16. A joint point 24 of the longitudinal wall portion 20 to the hood ledge reinforce 23, which is located at the lower edge of the longitudinal wall portion 20 or the outer edge of the joint portion 22 in the vehicle transverse direction 16, is positioned closer to the outer side in the vehicle transverse direction 16 than the inner edge 18a of the platform portion 18 in the vehicle transverse direction 16.

Moreover, the longitudinal wall portions 19 and 20 are formed so that the length L2 of the longitudinal wall portion 20 can be longer than the length L1 of the longitudinal wall portion 19, that is, so that a height difference between the platform portion 18 and the joint point 24 of the longitudinal wall portion 20 to the hood ledge reinforce 23 can be larger than a height difference between the platform portion 17 and the platform portion 18. Furthermore, the longitudinal wall portions 19 and 20 are formed so that the slant angle $\gamma$ of the longitudinal wall portion 20 can be larger than the slant angle $\beta$ of the longitudinal wall portion 19.

When a large load is applied to the fender 14 from above, the longitudinal wall portions 19, 20 and 21, and platform portions 17 and 18 are deformed in a folded and falling manner. Specifically, the longitudinal wall portion 19 falls toward the inner side in the vehicle transverse direction 16 with the lower edge 19a thereof as a fulcrum, and the longitudinal wall portion 20 falls toward the inner side in the vehicle transverse direction 16 with the joint point 24 thereof as a fulcrum.

Hence, in addition to the above-described effect of the second embodiment, the reaction force to the applied load can be lowered, and the impact energy can be absorbed far more efficiently.

Moreover, the longitudinal wall portions 19 and 20 are formed so that the slant angle $\gamma$ of the longitudinal wall portion 20 can be larger than the slant angle $\beta$ of the longitudinal wall portion 19. Therefore, the longitudinal wall portion 20 is easier to fall than the longitudinal wall portion 19 at the time of deformation, and the reaction force of the longitudinal wall portion 20 to the load applied thereto from above becomes smaller than that of the longitudinal wall portion 19. However, the longitudinal wall portion 20 is formed so as to be longer than the longitudinal wall portion 19, and therefore, the displacement of the platform portion 18 in the direction of the load applied thereto at the time of deformation becomes larger than that of the platform portion 17. Hence, amounts of the impact energy absorbed by the longitudinal wall portions 19 and 20 can be balanced, each of which is a product of the magnitude of the reaction force to the applied load and the magnitude of the displacement of the platform portion in the direction of the load applied thereto. Thus, the energy absorption at the time of deformation can be carried out smoothly.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein. The present disclosure relates to subject matter contained in Japanese Patent Application No. 2002-071311, filed on Mar. 15, 2002, the disclosure of which is expressly incorporated herein by reference in its entirety.

What is claimed is:

1. A fender structure comprising:

a hood for covering an engine compartment; and a pair of fenders provided at sides of the engine compartment, each of the fenders having:

a first platform portion extending toward inside of the engine compartment and supporting an edge portion of the hood;

a first longitudinal wall portion extending downward from an inner edge of the first platform portion;

a second platform portion extending toward inside of the engine compartment below the first platform portion; and a second longitudinal wall portion extending downward from the second platform portion and joined to a reinforcing member in the engine compartment, wherein a space is provided between the second platform portion and the hood.

2. A fender structure comprising:

a hood for covering an engine compartment; and a pair of fenders provided at sides of the engine compartment, each of the fenders having:

a first platform portion extending toward inside of the engine compartment and supporting an edge portion of the hood;

a first longitudinal wall portion extending downward from an inner edge of the first platform portion;

a second platform portion extending toward inside of the engine compartment below the first platform portion; and a second longitudinal wall portion extending downward from the second platform portion and joined to a reinforcing member in the engine compartment, wherein the first and second longitudinal wall portions are slanted, extending outward in a vehicle transverse direction.

3. The fender structure according to claim 2, wherein a slant angle of the second longitudinal wall portion is larger than a slant angle of the first longitudinal wall portion, and a length of the second longitudinal wall portion is longer than a length of the first longitudinal wall portion.

4. The fender structure according to claim 2, wherein a slant angle of the second longitudinal wall portion is larger than a slant angle of the first longitudinal wall portion, and a height difference between the second platform portion and a joint point of the second longitudinal wall portion to the reinforcing member is larger than a height difference between the first platform portion and the second platform portion.

* * * * *